No. 684,180. Patented Oct. 8, 1901.
T. BRALEY.
KNOCKDOWN COOP OR CRATE.
(Application filed June 17, 1901.)
(No Model.) 2 Sheets—Sheet 1.
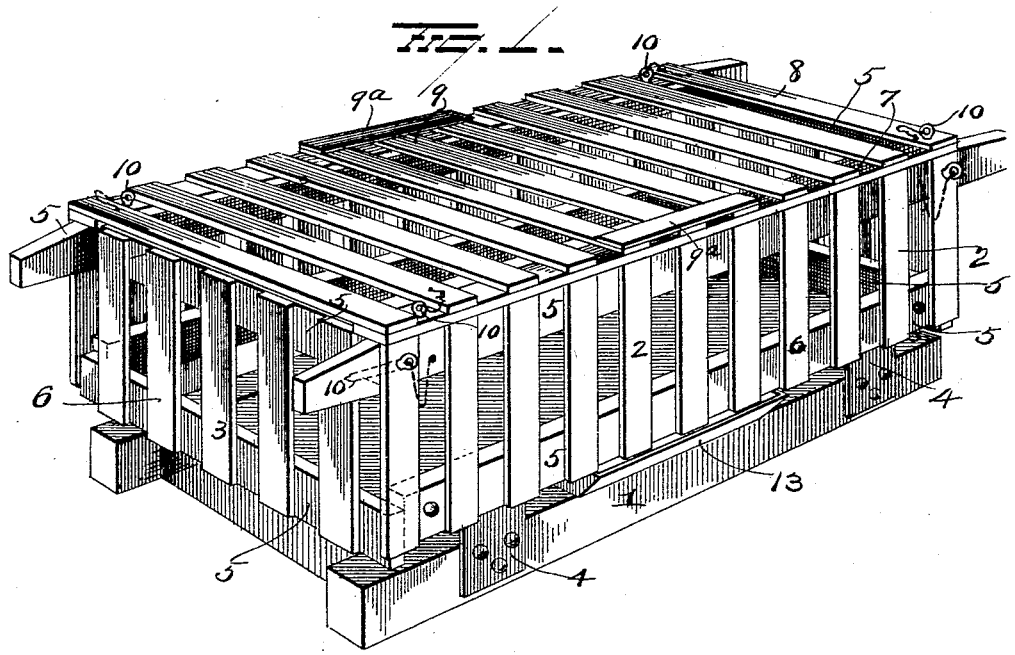
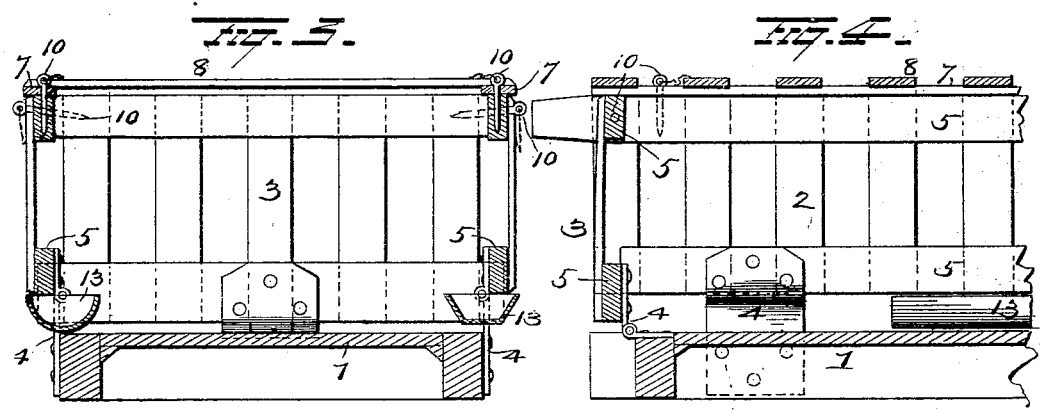

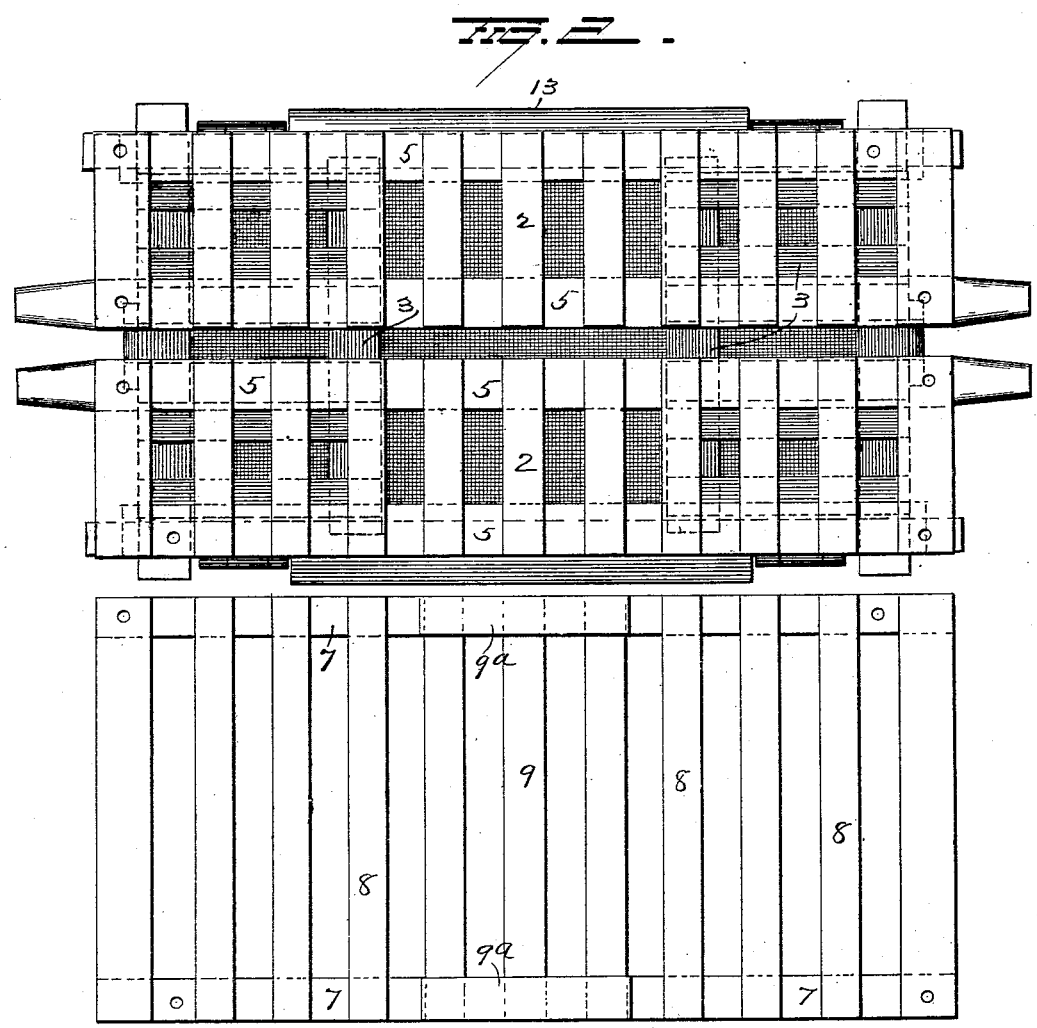

UNITED STATES PATENT OFFICE.

THURMAN BRALEY, OF PROCTORVILLE, OHIO.

KNOCKDOWN COOP OR CRATE.

SPECIFICATION forming part of Letters Patent No. 684,180, dated October 8, 1901.

Application filed June 17, 1901. Serial No. 64,885. (No model.)

*To all whom it may concern:*

Be it known that I, THURMAN BRALEY, a resident of Proctorville, in the county of Lawrence and State of Ohio, have invented certain new and useful Improvements in Knockdown Coops or Crates; and I do hereby declare the following to be a full, clear, and exact description of the invention, such as will enable others skilled in the art to which it appertains to make and use the same.

My invention relates to an improvement in knockdown coops or crates, the object of the invention being to provide a device of this character which can be folded into a small space and quickly and securely built up to form a perfect coop or crate.

A further object is to provide a device of this character which will be simple in construction, cheap to manufacture, and strong and durable to withstand the rough usage to which devices of this character are subjected.

With these objects in view the invention consists in certain novel features of construction and combinations and arrangements of parts, as will be more fully hereinafter described, and pointed out in the claims.

In the accompanying drawings, Figure 1 is a view illustrating my improvements. Fig. 2 is a view of the coop or crate folded or knocked down, and Figs. 3 and 4 are views in section of Fig. 1.

1 represents the base or bottom of the coop, which may be of wood or metal and to which the sides 2 and ends 3 are connected by hinges 4, as shown. The sides 2 and ends 3 are preferably composed of parallel horizontal bars 5, spaced apart and connected by a series of vertical slats 6, the lower bar of the side sections being preferably held in a higher plane than the lower member of the ends, so as to permit the latter to be folded down on the base and the sides folded down onto the ends when knocking down the coop or crate for packing it into a small space for shipment or storage.

The top of the coop or crate comprises parallel bars 7, spaced apart and connected by slats 8, a removable or movable slat 9 being supported beneath guide-plates 9ª on said top to permit the entrance or removal of the chicken, and a suitable locking mechanism may be provided to prevent accidental movement of this slat 9.

To secure my improved coop or crate in operative position, I provide a series of pins or plugs 10, preferably permanently attached to the sides and top by cords 11, as shown.

In assembling the crate or coop the sides are swung outward and then the ends. The sides are then moved to a vertical position, and the lower bars of the ends, which are made longer than the upper bars, are moved into engagement with the ends of the lower bars of the sides, so as to necessitate the upper bars of the ends being forced inward to aline holes therein with holes in the upper bars of the sides, into which the pins or plugs 10 are driven, and owing to the outward spring of the end sections the pins or plugs will be firmly held in position and prevented from working loose. The top of the coop is next secured in place by the pins or plugs 10 being driven through the side bars 7 thereof and into the upper bars of the sides 2, when the coop or crate is ready for use.

In packing the coop or crate for shipment the ends are first folded inward, the sides then folded onto the ends, the top next placed on the sides, and the pins or plugs 10 driven into alined holes in the top and lower or outside bars of the folded side sections to secure the crate or coop in its folded position, as shown in Fig. 2.

It will be seen that while my improvements are especially adapted for use as a chicken-coop they are also equally well adapted for use as a crate or box for shipping fruit and the like.

The upper bars of the sides are preferably made long to form handles, and one side has secured thereto by means of a suitable hinge, as shown, a trough 13. This trough is adapted for water or food and is about the thickness of the lower bar of the side, so as not to interfere with the folding of the coop, and may be secured to the vertical slats or to the bar, as desired, or the trough may be secured beneath the lower bar, the latter being elevated slightly, as above explained.

Instead of employing slats I might employ wire-netting connecting the parallel bars of the top, sides, and ends. Various other slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. In a coop or crate, the combination with a base or bottom, of sides hinged to the base, ends hinged to the base, the upper ends of said ends entering between the sides and the bottom hinged portion of said ends overlapping the ends of the bottom bars of the sides for the purpose set forth and plugs or pins adapted to be forced through holes in the sides and into holes in the upper portion of the ends when the upper portions of the latter are sprung or forced inward between the sides.

2. In a coop, the combination with a base, of sides comprising bottom and top bars connected together, and ends, said sides and ends hinged to the base, a top, means for fastening the several parts together at their free edges, and a trough attached to the bottom bar of a side section and adapted to permit the latter to be swung down onto the base.

3. A coop comprising a base and side and end sections hinged thereto, a top, and a trough hinged to the lower edge of a side section and adapted to permit the latter to be swung down onto the base.

In testimony whereof I have signed this specification in the presence of two subscribing witnesses.

THURMAN BRALEY.

Witnesses:
   FRED FEURT,
   FRED OLLOM.